United States Patent

Mueller et al.

[11] Patent Number: 5,826,565
[45] Date of Patent: Oct. 27, 1998

[54] INTERNAL COMBUSTION ENGINE WITH EXTERNALLY SUPPLIED IGNITION AND DIRECT INJECTION

[75] Inventors: Martin Mueller, Moglingen; Uwe Maienberg, Stuttgart, both of Germany

[73] Assignee: Robert Bosch GmbH, Stuttgart, Germany

[21] Appl. No.: 875,943

[22] PCT Filed: Jul. 24, 1996

[86] PCT No.: PCT/DE96/01352

§ 371 Date: Aug. 8, 1997

§ 102(e) Date: Aug. 8, 1997

[87] PCT Pub. No.: WO97/23721

PCT Pub. Date: Jul. 3, 1997

[30] Foreign Application Priority Data

Dec. 21, 1995 [DE] Germany ............... 195 47 916.5

[51] Int. Cl.⁶ .................................................. F02B 23/10
[52] U.S. Cl. .......................................... 123/520; 123/302
[58] Field of Search ................... 123/294, 302, 123/432, 442, 516, 518, 519, 520, 184.42, 295

[56] References Cited

U.S. PATENT DOCUMENTS 5,245,975  9/1993  Ito ............................................. 123/520

*Primary Examiner*—Thomas N. Moulis
*Attorney, Agent, or Firm*—Edwin E. Greigg; Ronald E. Greigg

[57] ABSTRACT

An internal combustion engine with externally supplied ignition and direct injection comprising an intake tube, having at least two combustion chambers with at least one inlet valve and at least one outlet valve per combustion chamber and a fuel injection valve that injects directly into the combustion chamber. A supply line to the at least one inlet valve of each combustion chamber, in which air that is controlled by a throttle mechanism flows from the intake tube, wherein evaporated fuel from a fuel vapor retention system of a fuel tank of the engine is supplied to the air downstream of the throttle mechanism. The introduction of the evaporated fuel from the fuel vapor retention system into the supply line is only carried out in a partial number of the combustion chambers, in particular in a single combustion chamber of the engine. The internal combustion engine according to the invention, with externally supplied ignition and direct injection, is suitable for motor vehicles that have a fuel vapor retention system.

18 Claims, 2 Drawing Sheets

INTERNAL COMBUSTION ENGINE WITH EXTERNALLY SUPPLIED IGNITION AND DIRECT INJECTION

Prior Art

The invention is based on an internal combustion engine with externally supplied ignition and direct injection. An internal combustion engine with externally supplied ignition and direct injection has already been disclosed (EP 0 488 254 B1), which, as shown in the exemplary embodiment in FIG. 1, has four cylinders or four combustion chambers, each with a fuel injection valve that injects the fuel directly into the combustion chamber so that a relatively narrowly defined cloud of fuel droplets is produced in the combustion chamber. The cloud of fuel droplets is stratified in laminar fashion and due to an especially shaped piston bottom, reaches a spark plug in a whirling shape, which spark plug initiates a chronologically controlled combustion of the cloud of fuel droplets. The internal mixture production by means of the directly injecting fuel injection valve is known to one skilled in the art as so-called stratified charging or charge stratification. The state of the stratified charging or charge stratification in the combustion chambers, though, is limited to the operational lower partial load range of the engine, in particular, to the idling range. The relatively narrowly defined cloud of fuel vapor permits the execution of a combustion with a high air excess in the combustion chamber, which leads to a reduction of the fuel consumption as well as to a reduction in the emission of polluting exhaust components in the exhaust. In the higher load range of the engine, though, in particular in the upper partial load range and the full load range, it is necessary to increase the quantity of fuel delivered by the fuel injection valve in order to thus fulfill the desired, increased performance requirements. The fuel quantity delivered by the fuel injection valve is high in such a way that a state of charge stratification in the combustion chambers can no longer be produced, so that what is sought is an essentially homogeneous distribution of fuel in the combustion chambers in order to burn the fuel, as was previously customary, without an air excess, with a virtually stoichiometric fuel-air ratio.

In order to achieve the transition from the state of charge stratification, which is characterized by a fuel-air mixture that is extremely lean on average, into the state characterized by a homogeneous distribution of fuel, with a particular fuel-air ratio in the upper partial load range and in particular, the full load range, in the combustion chambers of the engine, in the prior art mentioned at the beginning, a throttle valve that can be actuated by an electromotor and is rotatably accommodated in an intake tube of the engine. Downstream of the throttle valve, the intake tube feeds into an intake distributor, which delivers the air in individual supply lines, which is aspirated by the engine via the intake tube, to the inlet valves of the cylinders.

Furthermore, downstream of the throttle valve, a supply opening is provided in the intake tube, from which fuel is delivered into the supply line, which fuel comes from an electromagnetically actuatable valve. The valve is part of a fuel vapor retention system of a fuel tank of the engine and is sufficiently known to one skilled in the art as a so-called regenerating valve or tank ventilation valve. The fuel vapor retention system also has an adsorption filter, which is filled with an adsorption medium, in particular with activated charcoal in order to temporarily store the fuel vapors evaporating from the fuel tank. In particular operational ranges of the engine, the valve delivers the fuel vapors temporarily stored in the adsorption filter from the supply opening into the intake tube in order for the vapors to reach the combustion chambers of the cylinders in an evenly distributed form via the intake tube distributor, in which combustion chambers the fuel vapors are subsequently burned. Due to the limited storage capacity of the adsorption filter, it must be regenerated, that is, must be discharged of the stored fuel, for which purpose a ventilation line is provided on the adsorption filter, into which air can flow in an open position of the valve, which air then scavenges the fuel temporarily stored in the adsorption filter. As a result of the introduction of the fuel before the inlet valve of the engine, a state of stratified charging can no longer be produced in the combustion chamber since the fuel already mixes with air as the inlet valve overflows. Therefore, the advantages of charge stratification with regard to fuel consumption and reduction of the percentage of polluting components in the exhaust can no longer be achieved. As a result of this, the prior art mentioned provides for carrying out the introduction of the fuel by means of the valve only in the operational range of the upper partial load and in the full load range, since in these operational ranges, there should be a combustion with a homogeneous distribution of the fuel in the combustion chambers, which can be influenced only slightly by an external supply of additional fuel by means of the valve. In the upper partial load range, though, and in particular, in the full load range, there is no sufficient vacuum in the intake tube so that in addition, a pump device is provided which blows air into the adsorption filter in order to thus convey the fuel temporarily stored in the adsorption filter into the intake tube.

FIG. 11 of the prior art mentioned at the beginning, shows a second exemplary embodiment of an internal combustion engine with externally supplied ignition and direct injection. The engine has four cylinders or four combustion chambers, which each have two inlet and two outlet valves. Each inlet valve is separately connected to the intake tube distributor via a supply line so that for each cylinder, two supply lines respectively lead to the two inlet valves per cylinder. In one of the two supply lines per cylinder, a supplementary throttle mechanism in the form of a throttle valve, which can be actuated by an electromotor, is accommodated so that it can rotate in the one supply line and downstream of this throttle valve, a supply opening is provided in the supply line. The four supply openings shown in FIG. 11, that are provided downstream of the four throttle valves, in the eight supply lines, are connected to one another, for example by means of hoses, and communicate jointly with the valve. The introduction of fuel by means of the valve is carried out in such a way that the throttle valves are closed in the lower load range of the engine and are slightly open in the higher load range so that downstream of the throttle valves, a vacuum is generated in the supply lines, with the aid of which vacuum, the fuel temporarily stored in the adsorption filter can be sucked into the supply lines when the valve is open, without an additional pump device having to be required for this purpose. The introduction of the fuel by means of the valve, though, interrupts the state of stratified charging provided in the combustion chambers during the time that the adsorption filter is being regenerated.

ADVANTAGES OF THE INVENTION

The internal combustion engine with externally supplied ignition and direct injection has the advantage over the prior art that the supply of fuel by means of a valve of a fuel vapor retention system of a fuel tank of the engine is carried out in such a way that the state of stratified charging in at least one of the combustion chambers or in a number of them, or in the majority of the cylinders of the engine, which is characterized by a combustion with a high air excess, can be maintained even during the regeneration of the adsorption filter. This advantageously produces a further reduction of both the fuel consumption and the percentage of polluting exhaust components of the engine. Furthermore, it is particularly advantageous that the internal combustion engine according to the invention, with externally supplied ignition and direct injection, is embodied in a simpler manner, requiring fewer parts. In particular, a pump device provided in the prior art or a number of throttle valves in the supply lines to the inlet valves of the engine can be eliminated.

Advantageous updates and improvements of the internal combustion engine with externally supplied ignition and direct injection disclosed herein are possible by means of the measures set forth hereinafter.

BRIEF DESCRIPTION OF THE DRAWINGS

Exemplary embodiments of the invention are shown in a simplified manner in the drawings and will be explained in detail in the subsequent specification.

DESCRIPTION OF THE EXEMPLARY EMBODIMENTS

Figure 1:
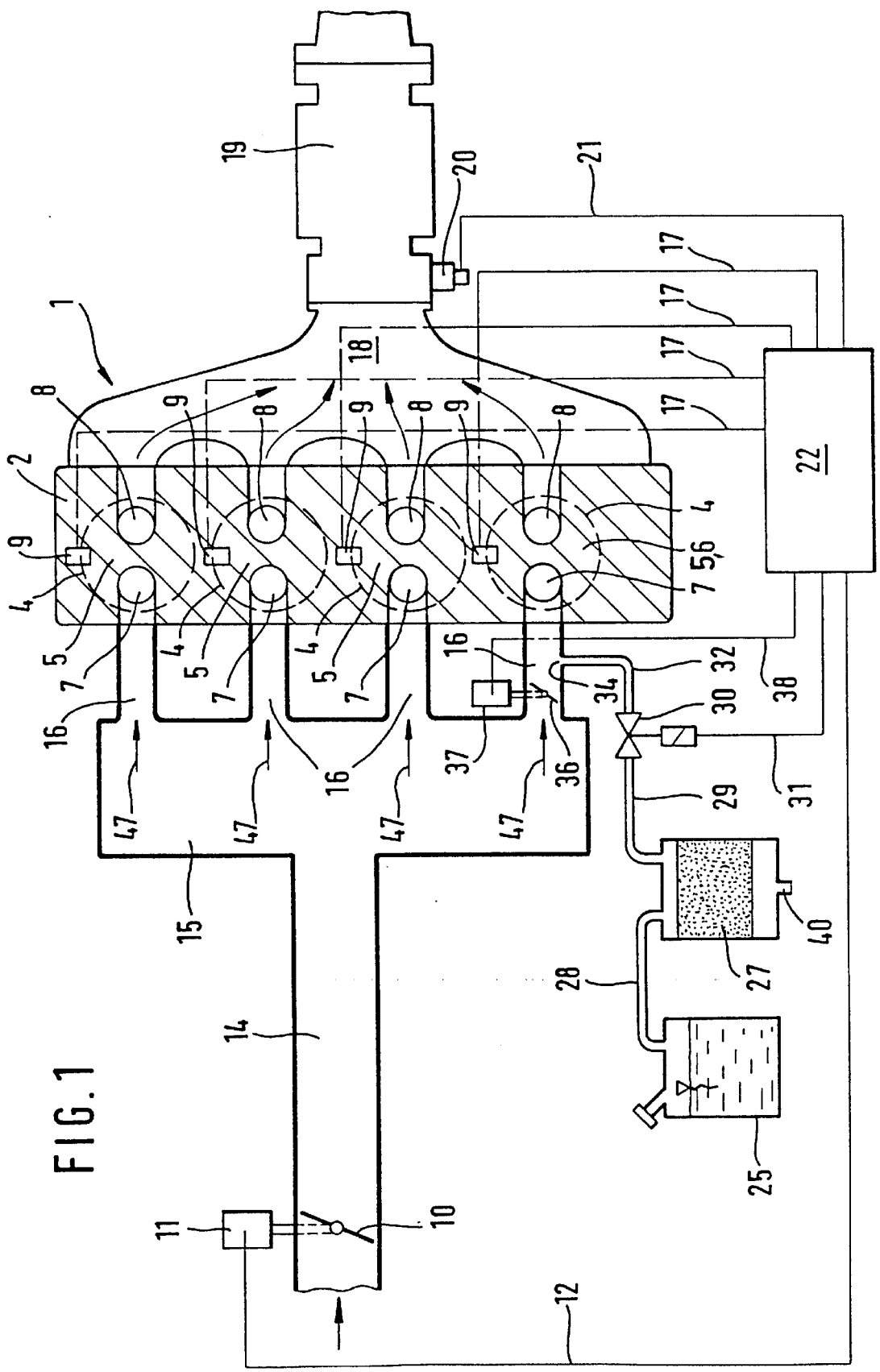
FIG. 1 is a schematically simplified representation of an internal combustion engine in accordance with a first exemplary embodiment according to the invention.
Figure 2:
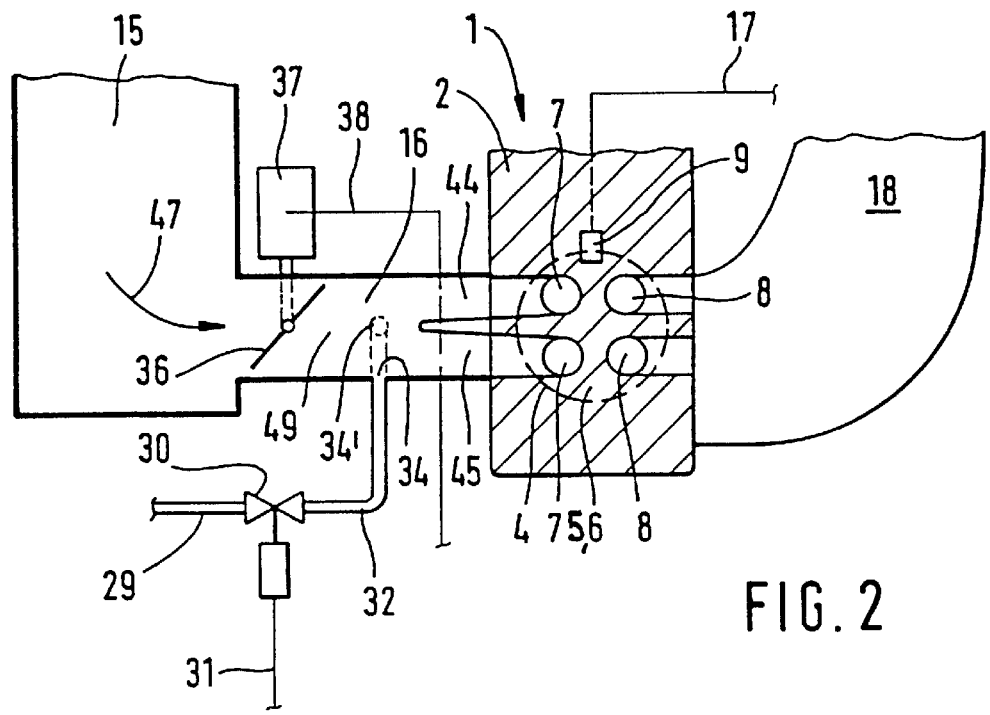
FIG. 2 is a detail from the internal combustion engine in accordance with a second exemplary embodiment according to the invention.
Figure 3:
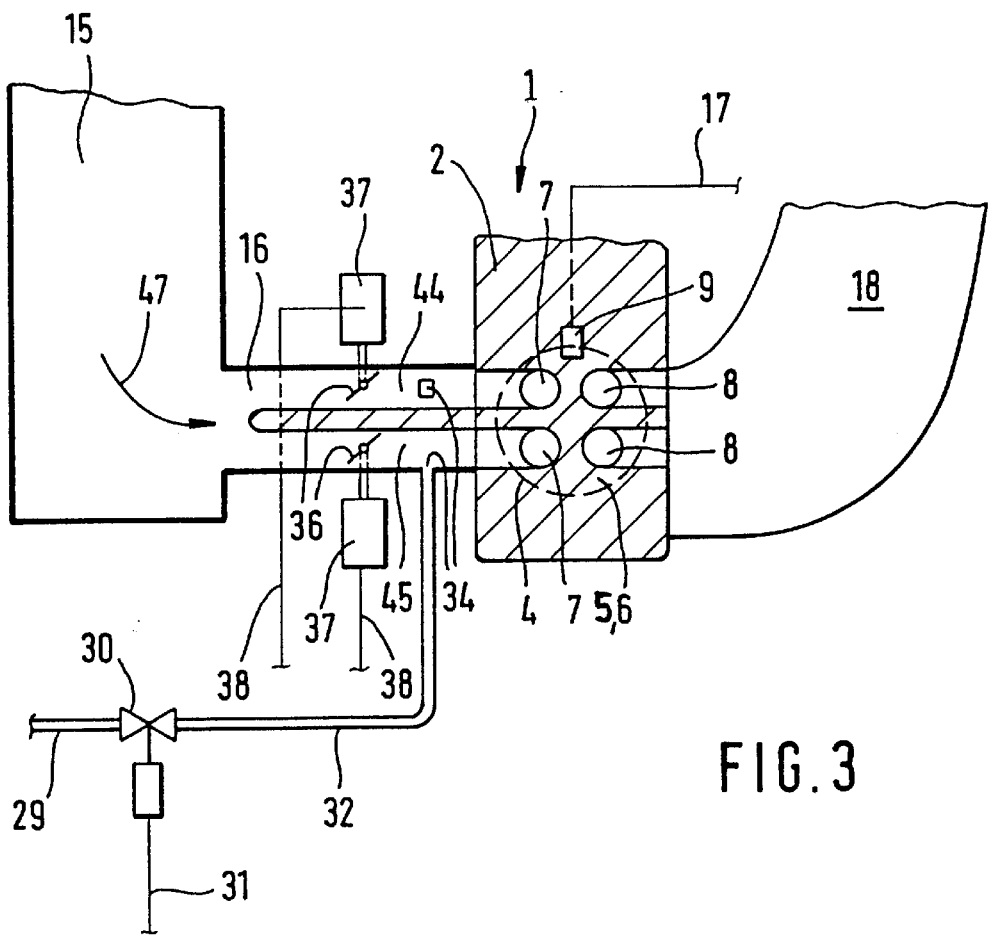
FIG. 3 is a detail from the internal combustion engine in accordance with a third exemplary embodiment according to the invention.

FIG. 1 is a schematically simplified representation of a first exemplary embodiment according to the invention of an internal combustion engine 1 with externally supplied ignition and direct injection. The engine 1 has an engine block 2, which has for example four cylinders 4, which are indicated in FIGS. 1 to 3 by means of correspondingly dashed, circular lines. However, it is also possible to provide an engine that has two, three, five, six or more cylinders. Pistons, not shown, are accommodated in a known manner in the cylinders 4. In order to move the pistons, fuel is burned in combustion chambers 5 of the engine 1, which are defined by the pistons and the cylinders 4, wherein the compression energy produced by the combustion is transmitted into corresponding kinetic energy of the pistons. The gas exchange in the combustion chambers 5 of the engine 1 can, for example, be carried out according to the four-stroke process or the two-stroke process. Gas exchange valves of a known type are provided to control the gas exchange in the combustion chambers 5 of the engine 1.

As shown in FIG. 1, each cylinder 4 or combustion chamber 5 of the engine 1 respectively has an inlet valve 7 and an outlet valve 8. The supply of fuel into the combustion chambers 5 of the engine 1 is carried out by means of at least one fuel injection valve 9 per combustion chamber 5. The for example four fuel injection valves 9 schematically represented in FIG. 1 can be embodied, for example, as electromagnetically actuatable and are connected via electrical lines 17 to an electronic control device 22, which can correspondingly trigger the fuel injection valves 9. The fuel injection valve 9 provided for each cylinder 4 delivers the fuel directly into the combustion chamber 5 of the engine 1 in a finely atomized form, preferably toward the end of the compression cycle, immediately before ignition so that a relatively narrowly defined cloud of fuel droplets is produced in the combustion chamber 5. In order to optimize the mixture production, a bottom of the piston can have an especially embodied piston shape, for example a bulge-trough shape, as indicated in EP 0 488 254 B1, in order, when the inlet valve 7 is open, to produce an air whirl in the combustion chamber 5 into which fuel is delivered by means of the fuel injection valve 9 so that the cloud of fuel droplets can spread out in the combustion chamber 5. The cloud of fuel droplets arrives, for example, in a laminarly stratified fashion at an ignition device provided in the combustion chamber 5, in particular a spark plug, which ignites the cloud of fuel droplets in a chronologically controlled manner. The relatively narrowly defined cloud of fuel droplets produces a combustion in the combustion chamber 5, which on average occurs when there is a high air excess or an intensely lean mixture. An internal mixture production of this kind by means of a directly injecting fuel injection valve 9 is known to one skilled in the art as a so-called stratified charging or charge stratification.

The control of the performance of the engine 1 is carried out essentially by changing the fuel quantity delivered by the fuel injection valves 9 into the combustion chambers 5 and partially by changing the air mass aspirated by the engine 1. The state of charge stratification in the combustion chambers 5 is limited to the lower and middle partial load ranges of the engine, in particular to the idling range, in order to produce an improved efficiency of the engine 1 by a combustion of the fuel with a high air excess so that the fuel consumption and the percentage of polluting exhaust components is reduced. In the upper partial load range, though, and in particular, in the full load range, it is necessary to deliver an increased amount of fuel into the combustion chambers 5 with the fuel injection valves 9 in order to thus fulfill the desire for higher performance and higher torque. It is no longer possible to maintain the state of charge stratification in the combustion chambers 5 so that what is sought is a stoichiometric combustion of the fuel without air excess in the combustion chambers 5. The fuel quantity delivered by the fuel injection valves 9 is increased in such a way that an essentially homogeneous distribution of fuel is produced in the combustion chambers 5. In the upper partial load range and in particular, the full load range, in order to achieve the transition from the stratified charging state, which is characterized by an extremely lean fuel-air mixture, into the state with a particular fuel-air ratio, which is characterized by a homogeneous distribution of fuel, in the combustion chambers 5 of the engine 1, a main throttle mechanism 10 is provided, which can be actuated, for example, by an electromotor adjusting drive 11.

As shown in FIG. 1, the main throttle mechanism 10 can be embodied, for example, in the form of a throttle valve 10, which is rotatably accommodated in an intake tube 14 of the engine 1, in order to correspondingly meter the air quantity aspirated in the intake tube 14 of the engine 1. The electronic control device 22, which is connected to the adjusting drive 11 via an electrical line 12, is used to trigger the adjusting drive 11. The triggering of the main throttle valve 10 is carried out, for example, in such a way that in the upper partial load range, the air aspirated by the engine 1 is throttled in the intake tube 14 to such a degree that a combustion is carried out in the combustion chambers 5 of the engine 1 with a virtually stoichiometric fuel-air ratio ($\lambda=1$). In the lower partial load range and the idling range of the engine 1, the main throttle valve 10 assumes an open position or an intermediate position in order to produce the state of charge stratification in the combustion chambers 5 when a particular fuel quantity is delivered by the fuel injection valves 9.

The intake tube 14 feeds into an intake tube distributor 15, which has a number of supply lines 16 that corresponds to the number of cylinders, i.e. in the exemplary embodiment, four supply lines 16. The intake tube distributor 15 distributes the air flowing into it from the intake tube 14 into the supply lines 16 to the inlet valves 7 or combustion chambers 5. The outlet valves 8 are connected in a known manner to an exhaust manifold 18, which conveys the exhaust gases of the combustion chambers 5 to a catalytic converter 19 connected to the exhaust manifold 18 for subsequent afterburning or secondary reaction. To monitor the combustion in the combustion chambers 5, a lambda sensor 20 is introduced into the exhaust flow upstream of the catalytic converter 19, which sensor communicates with the electronic control device 22 via an electrical line 21.

As is furthermore shown in FIG. 1, the engine 1 has a fuel vapor retention system that is used to retain the fuel components evaporating from a fuel tank 25 of the engine 1. To this end, an adsorption filter 27 is provided, which communicates with the fuel tank 25 via a tank line 28 and communicates with a valve 30 via a valve line 29. The adsorption filter 27 is filled with an adsorption medium, in particular activated charcoal, for storing the fuel vapors. The valve 30 is embodied as electromagnetically actuatable and is used for the introduction of fuel temporarily stored in the adsorption filter 27 in particular operational ranges of the engine 1. A valve 30 of this type is sufficiently known to one skilled in the art as a so-called regenerating valve or tank ventilation valve. The valve 30 is connected via an electrical line 31 to the control device 22 in order to be triggered by it, for example in a cyclical fashion.

According to the invention, the valve 30 communicates via a connection line 32 only with a partial number of the cylinders 4 or combustion chambers 5 of the engine 1, preferably with a single combustion chamber. However, it is also possible to carry out the introduction of the evaporated fuel by means of the valve 30, for example in an engine 1 that has four combustion chambers, into two or even three combustion chambers. In the exemplary embodiments, the introduction into a single combustion chamber 6 is shown, which is described below as the regenerating combustion chamber 6. For the regeneration of the adsorption filter 27, the fuel temporarily stored in the adsorption filter 27 is delivered by the valve 30 via the connection line 32 into a supply opening 34 provided in the wall or on the inside of the supply line 16, and then mixes with the air flowing in the supply line 16 in the direction of an arrow 47 in order to flow into the regeneration combustion chamber 6 in the form of a fuel-air mixture. This kind of fuel supply by means of the valve 30 is not provided in the remaining three combustion chambers 5. The valve 30 only delivers the fuel into the regeneration combustion chamber 6 in particular operational ranges of the engine 1 and is correspondingly triggered for this purpose by the electronic control device 22. Upstream of the supply opening 34, a supplemental throttle mechanism 36 is accommodated in the supply line 16 to the regeneration combustion chamber 6 and is embodied as a throttle valve 36 that can for example be actuated by an electromotor adjusting drive 37. The adjusting drive 37 is connected via an electrical line 38 to the electronic control device 22 in order to be controlled by it.

Because of the limited storage capacity of the adsorption filter 27, it is necessary that this be regenerated from time to time, i.e. rinsed with air, for which purpose a ventilation opening 40 is provided on the adsorption filter 27. Since the introduction of the evaporated fuel according to the invention is only carried out in a partial number of the combustion chambers 5, in the one regeneration combustion chamber 6 in the exemplary embodiment, in the remaining, for example three, combustion chambers 5, in the lower and middle partial load ranges and in particular, in the idling range of the engine 1, the combustion can be carried out once more in the state of charge stratification with a high air excess. For purposes of regenerating the adsorption filter 27 by means of the valve 30, the introduction of fuel into the regeneration combustion chamber 6 is preferably provided in the lower load range of the engine 1, in particular in the idling range, since in this range, a sufficient vacuum can be produced in the supply line 16 to the regeneration combustion chamber 6 with the aid of the supplemental throttle mechanism 36 that closes the cross section of the supply line 16 to a greater or lesser degree. The supplemental throttle valve 36 assumes a position in which an adaptation of the output delivered from the regeneration combustion chamber 6 to the output of the remaining combustion chambers 5 takes place. During the introduction of fuel into the supply line 16 by means of the valve 30, it is provided that the combustion in the regeneration combustion chamber 6 is carried out with an essentially stoichiometric fuel-air ratio. At times in which no introduction of fuel by means of the valve 30 is provided, a transition into the state of charge stratification of the regeneration combustion chamber 6 can be carried out, like in the remaining combustion chambers 5, and the supplemental throttle valve 36 can predominantly be opened completely. If the fuel temporarily stored in the adsorption filter 27 is possibly insufficient, in order to obtain a homogeneous distribution of fuel in the regeneration combustion chamber 6, then additional fuel can be admitted with the fuel injection valve 9 that is accommodated in the regeneration combustion chamber 6. The requirement for operational reliability of the supplemental throttle valve 36 is therefore low since in the event that the adjusting drive 37 fails or if the supplemental throttle valve 36 jams, a limited operation of the engine 1 is always possible by means of a corresponding control of the main throttle valve 10.

FIG. 2, a partial representation of the engine 1, shows a second exemplary embodiment of the invention according to the invention in which all the same parts or parts that function in the same manner are given the same reference numerals as in the first exemplary embodiment according to FIG. 1. Although FIG. 2 shows only one cylinder 4 or one combustion chamber 6, the engine 1 has for example four cylinders 4 or four combustion chambers 5, which each have two inlet valves 7 and two outlet valves 8, as shown in FIG. 2. However, it is also possible to provided three inlet valves and three outlet valves or an arbitrary, other number of inlet and outlet valves. The supply line 16 to the regeneration combustion chamber 6 has a number of branches 44, 45 that corresponds to the number of inlet valves 7. The two branches 44, 45 provided in the exemplary embodiment intake the air flowing in the supply line 16 or a fuel-air mixture in the supply line 16, which is produced by the delivery of fuel by means of the valve 30, and allocate it separately to the two inlet valves 7. The branches 44, 45 extend only partially from the inlet valves 7 into the supply line 16 so that upstream of the branches 44, 45, an unbranched part 49 remains in the supply line 16. The air or the fuel-air mixture flows in the supply line 16 in the direction of the arrow 47 to the inlet valves 7, which are then open, into the regeneration combustion chamber 6, wherein the supply opening 34 is accommodated upstream of the branches 44, 45, in the unbranched part 49 of the supply line 16, and the supplemental throttle valve 36 that can be actuated by an electromotor is accommodated slightly upstream of the supply opening 34. The supply opening 34 can feed into the supply line 16 so that it is disposed, as shown with solid lines, closer to one of the branches 44, 45, or so that it is disposed, as shown with dashed lines at 34', symmetrically in relation to the branches 44, 45. As has already been explained, the supplemental throttle valve 36 can assume different positions upon the introduction of the fuel by means of the valve 30, in order to thus correspondingly meter the air from the intake tube distributor 15 flowing in the supply line 16.

FIG. 3, a partial representation of the engine 1, shows a third exemplary embodiment of the invention according to the invention in which all the same parts or parts that function in the same manner are given the same reference numerals as in FIGS. 1 and 2. The multi-cylinder engine 1 with externally supplied ignition, which is shown in FIG. 3 with only one cylinder 4, has two inlet valves 7 and two outlet valves 8 per combustion chamber 5, like the engine 1 according to FIG. 2. However, in contrast to the second exemplary embodiment in FIG. 2, the supply line 16 is divided into two branches 44, 45 over its entire length in order to deliver the air, which flows from the intake tube distributor 15 into the supply line 16 in the branches 44, 45, separately via the inlet valves 7 into the regeneration combustion chamber 6. A supplementary throttle mechanism 36, which is embodied for example in the form of a throttle valve 36, is accommodated in each branch 44, 45 upstream of both inlet valves 7 in order to correspondingly meter the air flowing in the branches 44, 45. The delivery of fuel by means of the valve 30 is carried out in each of the branches 44, 45, which have at least one supply opening 34 for this purpose upstream of the inlet valves 7 and downstream of the throttle valves 36. The triggering of both of the second throttle valves 36 by means of the electronic control device 22 can be carried out, for example, in such a way that both throttle valves 36 in the branches 44, 45 assume an equal pivot position or also assume a pivot position divergent from each other's. However, it is also possible to provide a supply opening 34 in only one of the branches 44 or 45 in order to deliver fuel into the supply opening 34 by means of the valve 30. It is also conceivable to provide two valves 30 which deliver evaporated fuel via separate connection lines 36 into each supply opening 34 of the branches 44 and 45.

The foregoing relates to preferred exemplary embodiments of the invention, it being understood that other variants and embodiments thereof are possible within the spirit and scope of the invention, the latter being defined by the appended claims.

The Invention claimed and desired to be secured by Letters Patent of the United States is:

1. An internal combustion engine with externally supplied ignition and direct injection, comprising an intake tube, at least two combustion chambers with at least one inlet valve and at least one outlet valve per combustion chamber, a fuel injection valve that injects fuel directly into the combustion chamber, an air supply line to the at least one inlet valve of each combustion chamber, air in said supply line that flows from the intake tube is controlled by a throttle mechanism, wherein evaporated fuel from a fuel vapor retention system of a fuel tank of the engine is supplied to the air downstream of the throttle mechanism, the introduction of the evaporated fuel from the fuel vapor retention system into the supply line (16) is carried out in at least one combustion chamber (5) of the engine (1) in which the number of combustion chambers supplied with fuel is at least one less than a total number of combustion chambers of the engine.

2. An internal combustion engine with externally supplied ignition and direct injection according to claim 1, in which the engine (1) has at least two inlet valves (7) per combustion chamber (5), which are connected to the intake tube (14) via the supply line (16) and the supply line (16) has branches (44, 45) that correspond to the number of inlet valves (7) per combustion chamber (5) and the throttle mechanism (36) is accommodated in at least one of the branches (44, 45).

3. An internal combustion engine with externally supplied ignition and direct injection according to claim 4, in which at least one supply opening (34) is provided in at least one of the branches (44, 45) of the supply line (16), downstream of the throttle mechanism (36), via which opening the evaporated fuel from the fuel vapor retention system is introduced into the branch (44; 45).

4. An internal combustion engine with externally supplied ignition according to claim 1, in which a main throttle mechanism (10) is accommodated in the intake tube (14).

5. An internal combustion engine with externally supplied ignition according to claim 4, in which a main throttle mechanism (10) is accommodated in the intake tube (14).

6. An internal combustion engine with externally supplied ignition according to claim 3, in which a main throttle mechanism (10) is accommodated in the intake tube (14).

7. An internal combustion engine with externally supplied ignition and direct injection according to claim 4, in which the main throttle mechanism (36) is actuated via an electromotor.

8. An internal combustion engine with externally supplied ignition and direct injection according to claim 5, in which the main throttle mechanism (36) is actuated via an electromotor.

9. An internal combustion engine with externally supplied ignition and direct injection according to claim 6, in which the main throttle mechanism (36) is actuated via an electromotor.

10. An internal combustion engine with externally supplied ignition and direct injection according to claim 1, in which the evaporated fuel from the fuel vapor retention system is delivered into the supply line (16) by means of a valve (30).

11. An internal combustion engine with externally supplied ignition and direct injection according to claim 1, in which the throttle mechanism (36) is actuated via an electromotor.

12. An internal combustion engine with externally supplied ignition and direct injection, comprising an intake tube, at least two combustion chambers with at least two inlet valves for each combustion chamber and at least one outlet valve per combustion chamber, a fuel injection valve that injects fuel directly into the combustion chamber, an air supply line to the at least one inlet valve of each combustion chamber, air in said supply line that flows from the intake tube is controlled by a throttle mechanism, wherein evaporated fuel from a fuel vapor retention system of a fuel tank of the engine is supplied to the air downstream of the throttle mechanism, the introduction of the evaporated fuel from the fuel vapor retention system into the supply line (16) is carried out in at least one combustion chamber (5) of the engine (1) in which the number of combustion, chambers supplied with fuel is at least one less than a total number of combustion chambers of the engine, the at least two inlet valves are connected to the intake tube (14) via the supply line (16) and the supply line (16) includes branches (44, 45)

that correspond to the number of inlet valves (7) per combustion chamber (5) and the throttle mechanism (36) is accommodated in an unbranched part (49) of the supply line (16).

13. An internal combustion engine with externally supplied ignition according to claim 12, in which upstream of at least one of the branches (44, 45) and downstream of the throttle mechanism (36), at least one supply opening (34) is provided in the supply line (16) for the introduction of the evaporated fuel from the fuel vapor retention system.

14. An internal combustion engine with externally supplied ignition according to claim 12, in which a main throttle mechanism (10) is accommodated in the intake tube (14).

15. An internal combustion engine with externally supplied ignition according to claim 13, in which a main throttle mechanism (10) is accommodated in the intake tube (14).

16. An internal combustion engine with externally supplied ignition and direct injection according to claim 14, in which the main throttle mechanism (36) is actuated via an electromotor.

17. An internal combustion engine with externally supplied ignition and direct injection according to claim 15, in which the main throttle mechanism (36) is actuated via an electromotor.

18. An internal combustion engine with externally supplied ignition and direct injection according to claim 12, in which the valve (30) is embodied so that it is actuated electromagnetically.

* * * * *